United States Patent [19]

MacMillan

[11] 4,010,567

[45] Mar. 8, 1977

[54] ILLUMINATED FISHING FLOAT

[76] Inventor: Russell James MacMillan, 4604 SW. 32nd Drive, Hollywood, Fla. 33021

[22] Filed: Dec. 22, 1975

[21] Appl. No.: 643,526

[52] U.S. Cl. .............................................. 43/17.5
[51] Int. Cl.² ...................................... A01K 93/00
[58] Field of Search ................ 43/17.5, 17.6, 17

[56] References Cited
UNITED STATES PATENTS

| | | | |
|---|---|---|---|
| 2,179,878 | 11/1939 | Dietrich | 43/17 |
| 2,236,215 | 3/1941 | Klinitski | 43/17.5 |
| 2,534,709 | 12/1950 | Goertzen | 43/17 |
| 2,536,408 | 1/1951 | Addicks | 43/17.5 |

*Primary Examiner*—Warner H. Camp
*Attorney, Agent, or Firm*—Malin & Haley

[57] ABSTRACT

A fishing float has a watertight cylindrical receptacle for housing a battery and a lightbulb and a means for illuminating the lightbulb providing contact and current flow between the battery and the lightbulb disposed within the watertight receptacle, a transparent or translucent cap threadably connected to said receptacle to permit illumination from the lightbulb, means connected at one end of said receptacle for connecting the receptacle to a fishing line, and a buoyant floatation collar removably attachable about the exterior of said watertight receptacle and frictionably positionable along the longitudinal length of the receptacle. The collar includes a central aperture for receiving the receptacle and has a recessed portion adjacent one lip of the aperture such that the translucent cap may be sufficiently recessed on one side of the collar to adapt to different local ordinances regarding night fishing. The device is utilized as an illuminated bobber for night fishing.

2 Claims, 5 Drawing Figures

ILLUMINATED FISHING FLOAT

BACKGROUND OF THE INVENTION

This invention relates generally to an improved illuminated fishing float, and specifically to an illuminated fishing bobber for night fishing in which the device is attached to a fishing line to provide an illuminated indication while fishing at night that a fish is biting at the bait.

Many states have fishing ordinances which prevent illumination into the water while fishing at night. Also although many types of illuminated fishing floats have been shown in the prior art, most of these are expensive to construct and do not readily provide for the use of various sized fishing baits.

The instant invention provides an illuminated fishing float which is adjustably adaptable to prevent illumination from striking below the water line while at the same time providing an inexpensive and non-complex illuminated fishing float having an adjustable floatation collar to adapt the device for use in night fishing with light or heavy bait. The device includes one or more buoyant collars which are frictionally engageable about the illumination receptacle to allow for positional adjustment of the collars along the longitudinal length of the receptacle or the receipt of additional collars for additional buoyancy dependent upon the size of the bait being utilized. The collar also includes a recessed portion for mounting the illumination dome of a light to adjust the angle of illumination relative to the water surface to prevent (if desired) illumination below the surface of the water as required in some state fishing regulations.

BRIEF DESCRIPTION OF THE INVENTION

An improved illuminated fishing float for attachment to a fishing line to provide an indication of a fish biting at night comprising a watertight cylindrical receptacle, said receptacle including a transparent or translucent cap threadably engageable at one end of said receptacle, a battery receivable into said receptacle, a lightbulb, electrically conductive means connectable to said lightbulb and said battery for completing the circuit between the battery and the lightbulb to cause the lightbulb to illuminate, a flange connected to the opposite end of said cylindrical receptacle, said flange having an aperture for attaching a fishing line, and at least one buoyant collar, said collar having a circular aperture and sized to frictionally engage the exterior surface of the receptacle. One side of the collar includes a recessed lip adjacent the receptacle receiving aperture for receiving the bottom lip of the transparent or translucent cap. Recessing the cap into the collar regulates the illumination angle around the cap to prevent illuminating into the water. The device is turned off or on by screwing the lightbulb such that the contact on the lightbulb physically engages the battery contact. This is accomplished by rotating the cap of the device off so that the lightbulb may be actuated. In one embodiment, the collar is made of styrofoam and is donut-shaped and may be made of various thicknesses dependent upon the particular amount of floatation desired. The fishing line engaging flange including an aperture is integrally formed with the receptacle and allows the device to be secured to a fishing line and adjusted along the line for particular distance from the bait.

It is an object of this invention to provide an improved illuminated fishing float for night fishing.

It is another object of this invention to provide an illuminated fishing float which is adaptable to permit use under various state fishing regulations for night fishing.

And yet still another object of this invention is to provide an improved illuminated fishing float of reduced fabrication cost and increased efficiency of operation.

But yet still another object of this invention is to provide a fishing float having an adjustable buoyancy element to allow employment with different sized baits for night fishing.

In accordance with these and other objects which will be apparent hereinafter, the instant invention will now be described with particular reference to the accompanying drawings.

PREFERRED EMBODIMENT OF THE INVENTION

Figure 1:
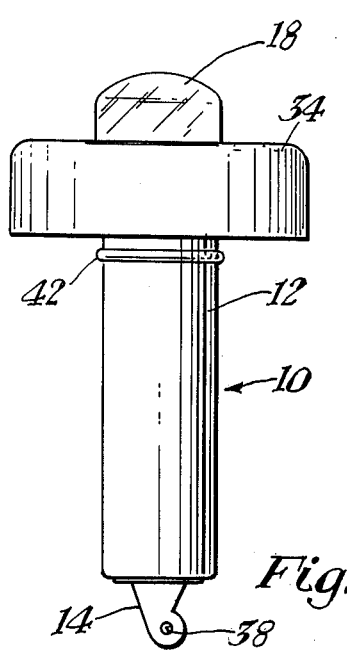
FIG. 1 shows a side elevational view of the instant invention.

Referring now to the drawings and especially FIG. 1, the instant invention is shown generally at 10 comprised of a plastic cylindrical receptacle 12 having disposed at its bottom end face a protruding flange 14 with a small aperture 38 disposed therein, the aperture 38 being sized for receiving a fishing line. Frictionally engaged about the exterior surface of receptacle 12 is a styrofoam floatation or buoyant collar 34 disposed against a transparent or translucent receptacle dome cap 18 threadably connected at one end of the device. Annular lip 42 prevents accidental removal of the collar 34.

Figure 2:
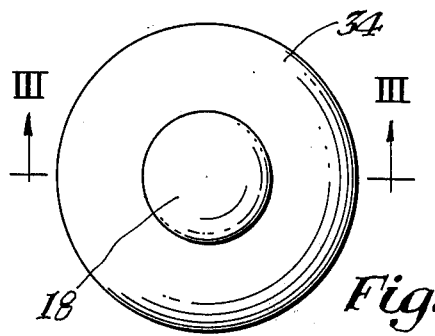
FIG. 2 shows a top plan view of the instant invention.

FIG. 2 shows a top view of the device showing the dome cap 18 and the buoyant collar 34 disposed beneath the cap 18.

Figure 3:
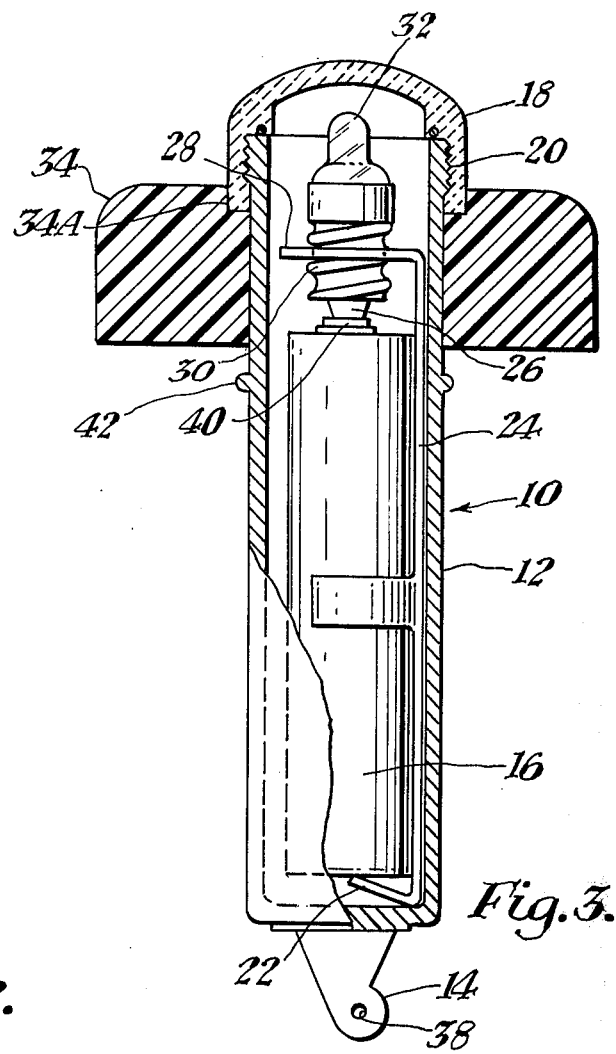
FIG. 3 shows a side elevational view partially in cross-section of the instant invention.

Referring now to FIG. 3, the device 10 includes the watertight receptacle 12 which is cylindrically shaped having a threaded portion 20 adjacent its upper open end which threadably receives translucent or transparent dome cap 18 providing a watertight seal for the interior of the receptacle 12. Within the receptacle 12 is a battery 16 which may be a 1.5 Volt conventional DC battery having a conductor 24 which includes a bent end 22 that engages the bottom contact end of the battery 16. The upper end of conductor 24 includes a lightbulb receiving portion 28 which threadably receives the threaded base 30 of bulb 32 such that the bulb may be rotated so that contact 26 engages the upper battery contact 40 to complete the circuit causing the lightbulb to illuminate. A donut-shaped buoyant collar 34 is frictionally engaged along the exterior surface of receptacle 12 and is moved into engagement with the cap 18 such that the lower lip of cap 18 is received into receded portions of collar 34 along groove 34A. The collar position shown in FIG. 3 shows one mode of operation which has the cap receded into the floatation collar to prevent light rays from being directed below the surface of the water when the device is floating on a body of water. The collar may be reversed relative to the receptacle and positioned such that the lower surface portion 34B shown may contact the dome cap 18 such that the cap rests on the flat upper surface of the collar thus allowing greater height for the illumination device.

Figure 4:
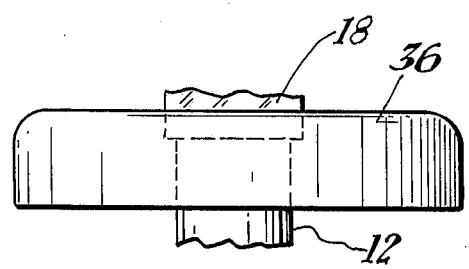
FIG. 4 shows a side elevational view of the floatation collar mounted with the dome cap partially recessed.
Figure 5:
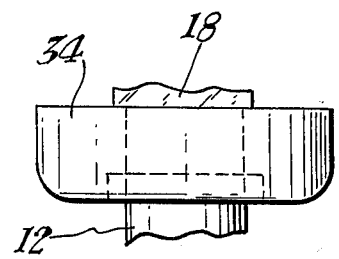
FIG. 5 shows a side elevational view of the floatation collar connected in one direction as utilized in the instant invention.

FIG. 4 shows the position of the dome as in FIG. 3 with the dome cap receded into the collar. FIG. 5 shows the collar reversed such that the dome cap and the upper surface are flush and that the dome cap is not recedably positioned within the collar. FIGS. 4 and 5 also show the use of two different collars 34 and 36 having different diameters for different floatation characteristics. The device may be used with one or more collars which may be frictionally slidable along the exterior surface of the container in the longitudinal direction of the longitudinal axis. An integral flange 42 prevents the collar from sliding off the bottom of the receptacle.

To operate the device (referring back to FIG. 3), cap 18 is threadably removed and bulb 32 is rotated so that the bulb contact 26 engages the battery contact 40 illuminating the bulb 32. With the cap 18 removed, the floatation collar 34 is placed around the exterior of receptacle 12 and positioned near the cap end of the receptacle (positioned as either shown in FIG. 4 or FIG. 5, dependent upon the particular position desired). If the collar is positioned as shown in FIG. 4, the bulb illumination around the collar will be restricted from being received below the surface of the water. If positioned as in FIG. 5, the dome cap will sit higher and thus permit more illumination surrounding the area. Once the bulb is illuminated, cap 18 is threadably installed back on the device and tightened for a watertight seal such that water cannot be received into the interior of receptacle 12. The device is connected to a fishing line through aperture 38 and placed in the water with the appropriate bait and may be observed to detect whether or not fish may be biting at the bait disposed at the end of the line.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An improved illuminated fishing float comprising:
   an elongated cylindrical receptacle having an open end including a plurality of threaded portions about said open end;
   a translucent cap threadably engageable over the open end of said receptacle, said cap providing a watertight seal for said receptacle;
   a battery mounted within said receptacle;
   an electrical conductor;
   a lightbulb mounted beneath said cap attached to said conductor and moveable to engage the contact of said battery, said conductor providing a complete circuit between said battery terminals and said lightbulb; and
   a reversible donut-shaped floatation collar having an upper surface and a lower surface frictionally engaged about a portion of the exterior surface of said receptacle, said collar including an annular recessed lip adjacent said upper surface for receiving said translucent cap, said lip being recessed to allow positionable adjustment of the bulb within the cap relative to the upper surface of said collar whereby the illumination angle may be varied.

2. An improved fishing float, as in claim 1, including:
   a flange disposed at the closed end of said cylindrical receptacle, said flange including an aperture for receiving a fishing line.

* * * * *